United States Patent [19]
Hunt et al.

[11] Patent Number: 5,626,437
[45] Date of Patent: May 6, 1997

[54] METHOD FOR IN-SITU BIOREMEDIATION OF CONTAMINATED GROUND WATER

[75] Inventors: Seth C. Hunt, Lakewood; Theodore O. Meiggs, Golden, both of Colo.

[73] Assignee: Foremost Solutions Inc., Lakewood, Colo.

[21] Appl. No.: 517,103

[22] Filed: Aug. 21, 1995

Related U.S. Application Data

[63] Continuation-in-part of Ser. No. 272,816, Jul. 11, 1994, Pat. No. 5,570,973.
[51] Int. Cl.$^6$ ........................................ B09B 1/00
[52] U.S. Cl. .................... 405/128; 210/610; 210/747; 405/258
[58] Field of Search ........................ 405/128, 129, 405/258; 210/601, 610, 747, 901; 435/262, 262.5

[56] References Cited

U.S. PATENT DOCUMENTS

| | | | |
|---|---|---|---|
| 4,493,895 | 1/1985 | Colaruotolo et al. | 210/610 |
| 4,850,745 | 7/1989 | Hater et al. | 405/258 |
| 4,859,594 | 8/1989 | Portier | 210/610 X |
| 4,987,068 | 1/1991 | Trosch et al. | 435/262 X |
| 5,133,625 | 7/1992 | Albergo et al. | 405/128 X |
| 5,161,914 | 11/1992 | Rahn et al. | 405/128 |
| 5,246,309 | 9/1993 | Hobby | 405/128 |
| 5,263,795 | 11/1993 | Corey et al. | 405/128 |
| 5,286,140 | 2/1994 | Mather | 405/128 |
| 5,299,638 | 4/1994 | Cheneviere et al. | 405/128 X |
| 5,456,550 | 10/1995 | Devlin | 405/128 |

*Primary Examiner*—George A. Suchfield
*Attorney, Agent, or Firm*—Edwin H. Crabtree; Ramon L. Pizarro; Donald W. Margolis

[57] ABSTRACT

A method for in-situ bioremediation of contaminated ground water and surface water using a porous wall filled with porous inorganic support spheres such as diatomaceous earth pellets treated by inoculation with selected non-pathogenic microbes, ie. bacteria, for destroying or converting the contaminant. The contaminants may be petroleum hydrocarbons, chlorinated hydrocarbons and other chemicals. The porous cells of the diatomaceous earth pellets provide a home not only for the microbes but also for oxygen, water and nutrients to help sustain the life of the augmented colonies of microbes introduced in the pellets. The method, in one embodiment, includes the digging of a trench perpendicular to the movement of the ground water and downstream from the contamination. The trench is dug below the level of the contaminated ground water and is filled with the porous inorganic support spheres creating the porous wall. Aeration pipes are installed at the bottom of the trench and gravel is used to fill the top of the trench. Also vent pipes may be installed in the trench for monitoring volatile contaminants emanating from the porous wall to monitor the progress of the bioremediation. Nutrients may be added in the form of aqueous solutions that are poured into the trench. The nutrients move by gravity downwardly feeding the microbes in the inorganic support spheres. Also, nutrients may be fed into the trench using the aeration tubes.

19 Claims, 2 Drawing Sheets

METHOD FOR IN-SITU BIOREMEDIATION OF CONTAMINATED GROUND WATER

This application is a continuation-in-part application of an application Ser. No. 08/272,816 filed on Jul. 11, 1994, now U.S. Pat. No. 5,570,973, by a common inventor Seth C. Hunt and having a title of "SYSTEM FOR BIOREMEDIATION OF CONTAMINATED SOIL USING INOCULATED SUPPORT SPHERES".

BACKGROUND OF THE INVENTION (a) Field of the Invention

This invention relates the use of selected non-pathogenic microbes for treating contaminated soil, ground water and surface water and more particularly, but not by way of limitation, to a system wherein microbes are introduced by inoculation into porous inorganic support spheres, such as diatomaceous earth pellets, and injected into fractures or trenches in the contaminated soil for destroying or converting the contaminant.

(b) Discussion of Prior Art

In U.S. Pat. No. 5,133,625 to Albergo et al. a method and apparatus used for subsurface bioremediation is described. Microorganisms, nutrients and gases are introduced into the soil using a push rod or cylinder connected to a delivery system on top of the ground. Also, U.S. Pat. No. 5,263,795 to Corey et al. and U.S. Pat. No. 3,094,846 to Peeler, Jr. describe in-situ remediation systems for treating sulfide contaminated soils from coal mining operations and the like.

U.S. Pat. No. 4,743,545 to Torobin, U.S. Pat. No. 4,987,068 to Trosch et al. and U.S. Pat. No. 5,096,814 to Aivasidis et al. describe different types of macroporous and microporous inorganic carriers used with microorganisms. The treated porous material is used for degradation of municipal sewage and industrial waste.

In U.S. Pat. Nos. 4,682,550 and 4,807,454 to Stanley Joy, a hand-held apparatus, method and technique is disclosed for loosening, aerating and fertilizing plant and tree roots. The technique described in the Joy patents is applicable to the subject invention as to loosening, aerating and adding nutrients to a subsurface area and is incorporated herein by reference. Also, U.S. Pat. No. 4,429,647 to Zinck describes a method of loosening used soil with a probe and compressed air. Further, U.S. Pat. Nos. 2,083,153 and 1,814,446 to Irish and U.S. Pat. No. 429,994 to Botter describe an older type of equipment for aerating soil and treating the soil with fertilizers etc.

None of the above mentioned prior art patents specifically disclose the unique features and method steps of the subject system for in-situ bioremediation of contaminated soil, ground water and surface water as described herein.

SUMMARY OF THE INVENTION

In view of the foregoing, it is a primary object of the invention to treat contaminated soil and ground water in-situ and destroy or convert the contaminant.

Another object of the present invention is to eliminate the need of removing contaminated soil and the expense associated with removing and transporting the contaminated soil to a land fill.

Still another object of the system for bioremediation is to treat the contaminated soil using non-pathogenic microbes which are similar to the natural occurring bacteria in the area surrounding the contaminated site.

A further object of the invention is the system for bioremediation can be practiced with little disturbance of the existing contamination site other than drilling spaced holes into the ground surface and creating a porous wall downstream from the movement of contaminated ground water for introducing diatomaceous earth pellets with microbes housed therein in the spaced apart drilled holes and the porous wall.

The subject system is used for in-situ bioremediation of contaminated soil, ground water and surface water wherein porous inorganic support spheres such as diatomaceous earth pellets are treated by inoculation with selected non-pathogenic microbes, ie. bacteria, for destroying or converting the contaminant. The contaminants may be petroleum hydrocarbons or chlorinated hydrocarbons or other chemicals. The porous cells of the diatomaceous earth pellets provide a home not only for the microbes but also for oxygen, water and other nutrients to help sustain the life of the augmented colonies of microbes introduced in the pellets. The contaminated soil is first prepared for treatment by creating fractures and fissures therein using fluid pressure introduced through spaced apart holes drilled to selected depths. The depth of the drilled holes and the hole spacing will depend on the area of contamination and the fracturability of the soil. The pores in the diatomaceous earth pellets, with microbes already stored therein, are then injected into the spaces of the fractures and fissures using air or liquid pressure. The diatomaceous earth pellets may range in size from 1.0 to 10 microns or larger. When the inoculated pellets are in place, the microbes have a permanent home to receive contaminants and to work from in destroying the contaminants. The drilled holes may also be retrofited with perforated pipe for supplementing the microbes with additional oxygen, water and nutrients or adding more pellets with microbes therein for completing the clean up of the contaminated soil and ground water.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
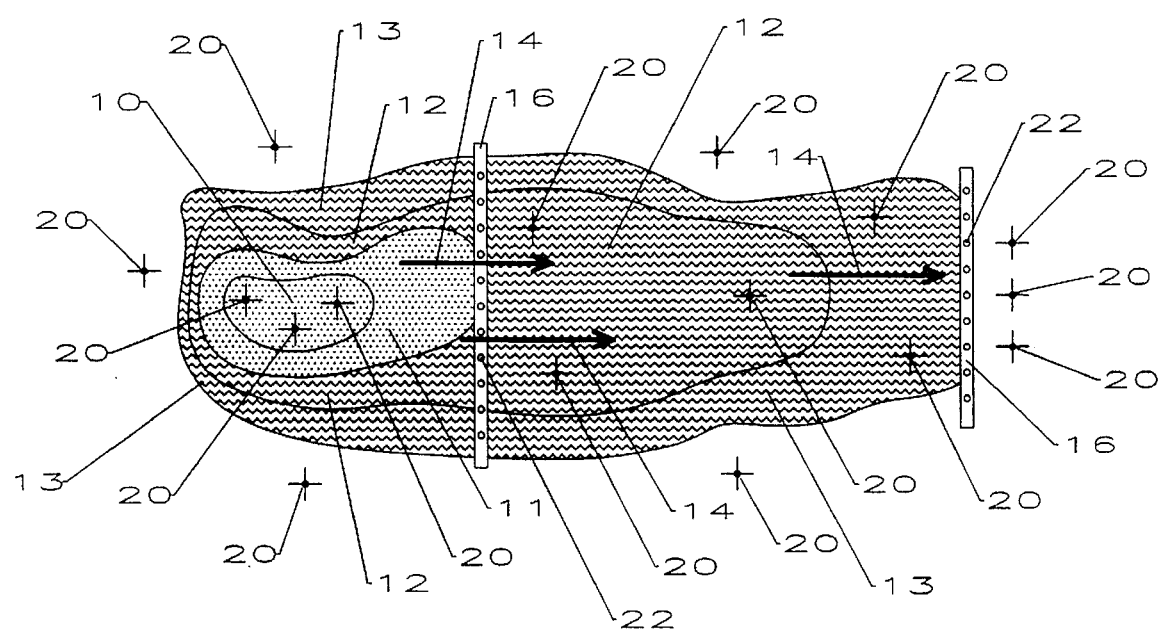
FIG. 1 is a top view of a contaminated ground site having a pair of porous underground walls downstream from the flow of contaminated ground water. The ground water is treating using the subject method for in-situ bioremediation wherein the porous walls are filled with inorganic support spheres such as diatomaceous earth pellets and treated by inoculation with selected non-pathogenic microbes, ie. bacteria, for destroying or converting the contaminant. The site also includes monitoring wells and air vents in the two porous walls.

In FIG. 1, a contaminated site 10 is shown having contaminated soil and ground water having shading 11 and contaminated ground water having shading 12 and flowing to a less contaminated zone 13 of ground water. The movement of the ground water 11, 12 and 13 is from left to right as indicated by arrows 14. The contaminants in the ground water may be petroleum hydrocarbons, chlorinated hydrocarbons or other chemicals which have been spilled on the soil or leaked from storage tanks.

Figure 2:
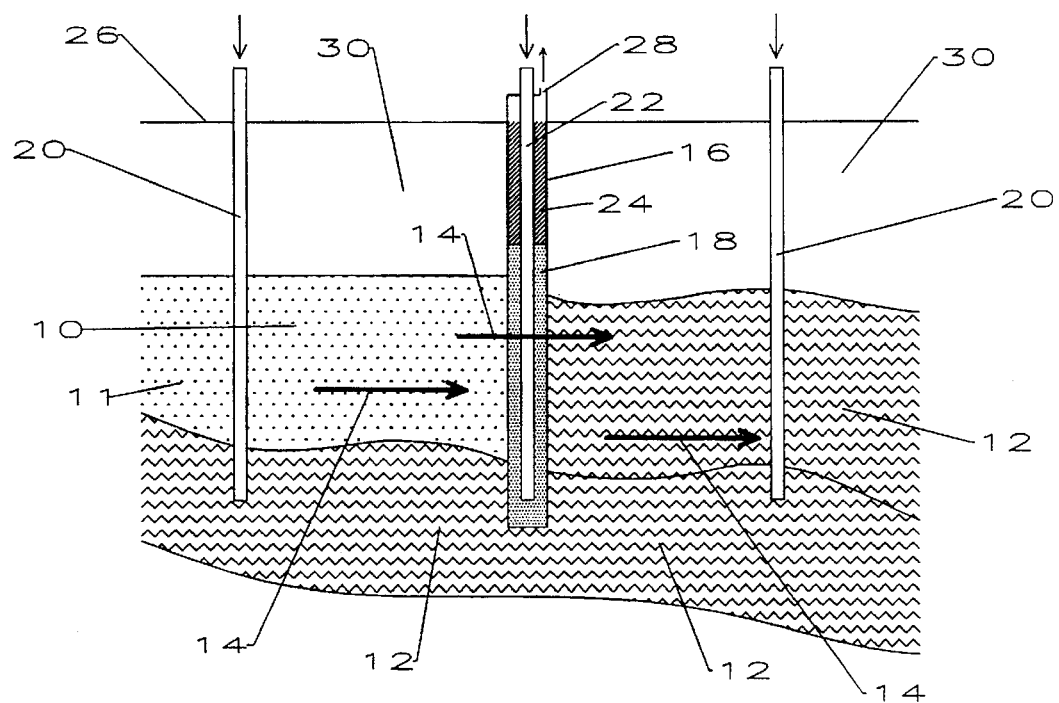
FIG. 2 is a sectional view of a portion of the ground surface shown in FIG. 1 with the contaminated ground water moving from left to right and a porous underground wall created by digging a trench below the level of the contaminated ground water and filling the trench with porous inorganic support spheres.

The subject method for in-situ bioremediation of contaminated ground water 11 or 12 uses a porous wall 16 filled with porous inorganic support spheres such as diatomaceous earth pellets 18 treated by inoculation with selected nonpathogenic microbes, ie. bacteria, for destroying or converting the contaminant. The porous cells of the diatomaceous earth pellets 18 provide a home not only for the microbes but also for oxygen, water and nutrients to help sustain the life of the augmented colonies of microbes introduced in the pellets. The porous wall 16 of pellets 18 is shown in FIG. 2. The microbes housed in the pellets 18 are not shown in the drawings.

In FIG. 1 a pair of porous walls 16 are shown with first wall 16 directly adjacent the contaminated soil and ground water site 10 and a second wall 16 downstream from the first wall 16. A plurality of monitoring wells 20 are located upstream and downstream from the porous walls 16. Ground water is withdrawn from these wells 20 to monitor the effectiveness of the two walls 16. Also, pumping of the downstream wells 20 will help draw contaminants through the porous walls 16. The ground water flow rate through the porous wall 16 can be adjusted by the pumping rate of the downstream wells 20. Further, ground water can be withdrawn from the downstream wells 20 and can be discharged or injected upstream from the contaminated site 10. If the water is still contaminated, it can be recycled through the porous wall 16 until acceptable contaminant level reductions are achieved.

In FIG. 2, a sectional view of a portion of the contaminated soil and ground water site 10 is shown with the first porous wall 16 treating the contaminated ground water 11. The wall 16 is created by the digging of a trench perpendicular to the movement of the ground water and downstream from the contamination site 10. The trench is dug below the level of the contaminated ground water 11 and is filled with the porous inorganic support pellets 18 creating the porous wall 16.

A plurality of aeration tubes 22 are installed at the bottom of the trench and gravel is used to fill the top of the trench. The aeration tubes 22 are used to assure that the proper amount of oxygen is available to sustain the bacteria immobilized in the pellets 18 filling the porous wall 16. For some applications, passive aeration may be sufficient. In other site locations, air or oxygen must be blown in through the aeration tubes 22.

Also, it should be noted that chlorinated hydrocarbons are best degraded using first anaerobic conditions and then aerobic conditions. In this example, strains of anaerobic dechlorinating bacteria are inoculated in the support pellets 18 in the upstream porous wall 16. Anaerobic conditions are maintained by flowing a small amount of methane through the aeration tubes 22 or by other means. The second downstream porous wall 16 is used for aerobic conditions, wherein air is blown in the aeration tubes 22 for the aerobic bacteria inoculated in the support pellets 18.

The trench is filled with the pellets 18 to two or three feet above the average level of the ground water. Gravel 24 is then added to the top of the pellets 18 to complete the filling of the trench up to a ground level 26. The area above the contaminated ground water 11 and uncontaminated ground water 12 is unsaturated soil 30.

Also, vent tubes 28 may be installed in the trench for monitoring volatile contaminants emanating from the porous wall 16 and to monitor the progress of the bioremediation. When highly volatile contaminants are present in the ground water, plastic sheeting is placed on top of the gravel 24 and the vent pipes 28 are received through the plastic sheeting. The top of the vent pipes 28 can be attached to carbon filters to trap the volatile contaminants.

Nutrients may be added in the form of an aqueous solution by pouring the solution into the wall 16. The solution moves downwardly by gravity feeding microbes in the inorganic support pellets 18. Also, nutrients may be fed into the wall 16 using the aeration tubes 22. As mentioned above, the monitoring wells 20 are located upstream and downstream for monitoring the effectiveness of the porous wall 16 and when necessary for recycling the water until acceptable contaminant levels are achieved.

In FIGS. 1 and 2, the use of porous walls 16 have been described for treating ground water 11. In a like manner, surface water can also be treated using the inoculated diatomaceous earth pellets 18 received in porous sacks which hold the pellets 18 in place and allow the contaminated surface water to flow therethrough. For example, a simple dam structure can be built using porous sacks holding the pellets 18 therein. The contaminated surface water is directed into a reservoir up stream from the dam structure and allowed to permeate through the porous sacks with the inoculated pellets 18 treating the contaminants in the contaminated surface water. Obviously, and similar to having more than one porous wall 16, the surface water can be treated by a plurality of porous dam structures, water diversion ditches, drains, utility piping and other means for receiving the pellets and allowing the surface water to be treated. The above mentioned method of treating surface water is not shown in the drawings.

Figure 3:
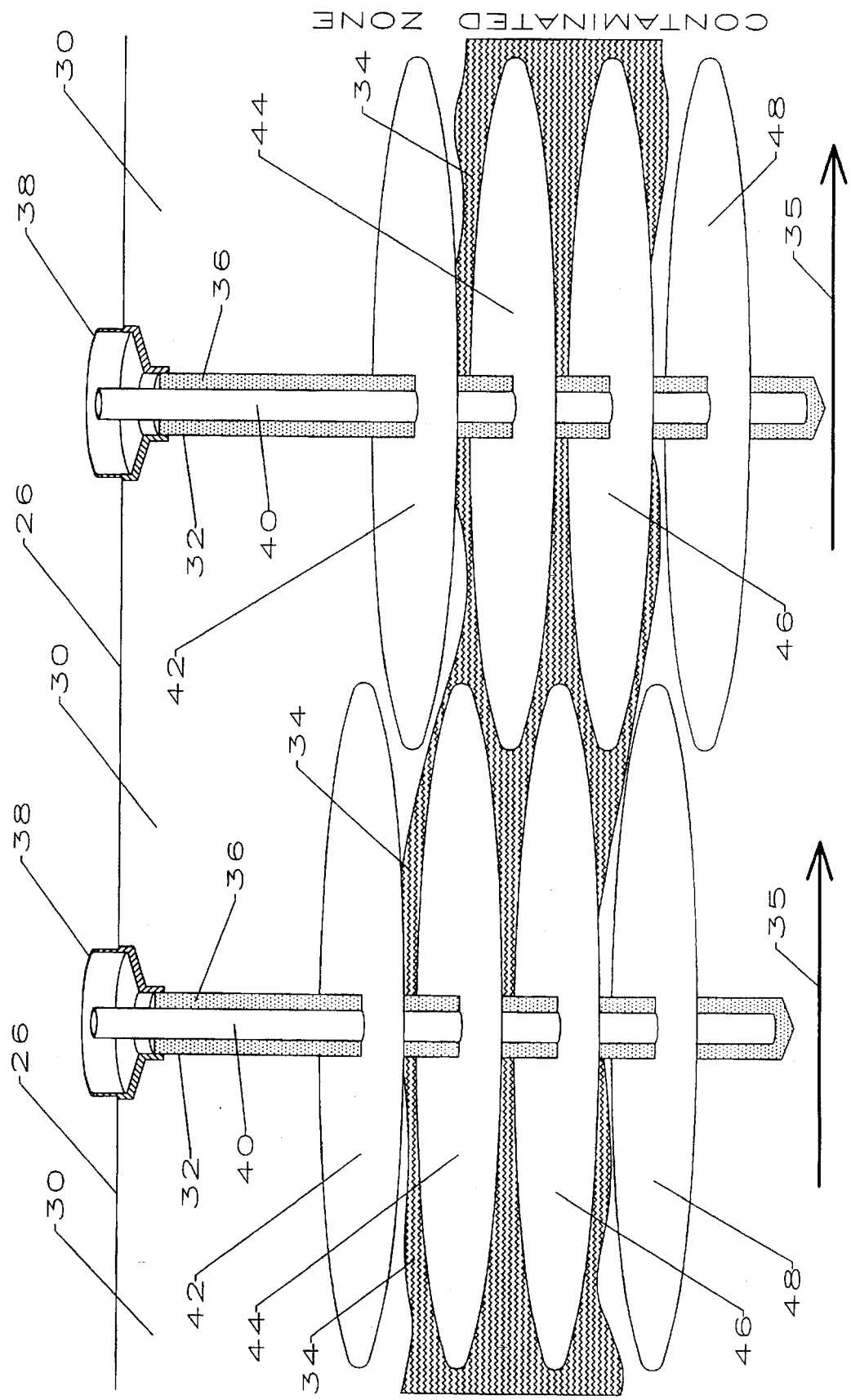
FIG. 3 illustrates a perspective view of a contaminated ground site wherein the inoculated porous inorganic support spheres are put in place using another method. In this example, the soil is hydraulically fractured creating fractures and fissures therein using a large volume of fluid pressure introduced through spaced apart holes drilled to selected depths. The depth of the drilled holes and the hole spacing will depend on the area of contamination and on the fracturability of the soil. The diatomaceous earth pellets, with microbes already stored therein, are injected into the spaces of the fractures and fissures using a liquid slurry mixture.

It should be noted that while high pressure air is helpful in creating fractures and fissures in contaminated soils, air pressure might not always be sufficient in loosening and breaking up the subsurface soil for complete bioremediation. In FIG. 3, another method of treating contaminated soils using hydraulic pressure or hydrofracturing of the subsurface is described.

In FIG. 3, from the ground surface 26 a pair of drill holes 32 are drilled vertically through the uncontaminated soil 30 into a contaminated soil site 34. In this example, the ground water level is below the contaminated soil site 34 as indicated by arrows 35 and the use of the porous walls 16 as described in FIGS. 2 and 3 are not required. The holes 32 may be drilled using a hollow stem auger with a split spoon or similar type of drill. Each hole 32 is drilled to within a few feet of the top of the contaminated soil 34 while continuous core samples are taken. A 2½ inch casing 36 is installed in the drill hole 32 to provide a seal. A jet spray is introduced into the bottom of the hole 32 and just below the bottom of the casing 36. A 360 degree starter niche for fractures in the soil is started using high pressure water from the jet spray. The jet spray is then removed and hydrofracturing equipment with mixing tank 38 is placed next to the top of each hole 32.

The hydrofracturing mud is made up of water and powdered guar gum which becomes viscous after hydration. The mud is prepared by using a pump to continuously mix the viscous guar gum with the porous inorganic support spheres such as the diatomaceous earth pellets 18. The pellets 18 as mentioned above are pretreated by inoculation with selected non-pathogenic microbes, ie. bacteria, for destroying or converting the contaminant in the contaminated site 34. The mixture may also contain a cross link chemical such as borate and a polymer breaker such as a cellulose enzyme. The cross link chemical is designed to keep the mud in a continuous non-separating viscus liquid form. The purpose of the breaker is to break down the viscus mud to water after 24 to 36 hours. The relative amounts of each component of the mud mixture can be adjusted as necessary to obtain the best consistency for fracturing the contamination site 34.

A constant rate pump is attached to a packer assembly with a high pressure hose. The hose is connected to a 1 inch piping 40 received inside the casing 36 with the end of the piping 40 disposed next to the 360 degree starter niche. The pumping of the mud is now started and fracturing of the soil is started. The pumping is stopped after about 15 minutes or when a calculated amount of mud has been added. The estimated fractures filled with the mud mixture extend outwardly as flattened pancakes in all directions. These fractures may range in size from to 20 to 40 feet in diameter or more. The upper fractures with the pellets 18 are shown as circular fracture zones 42. When the fracturing of zones 42 is completed, the drilling process is continued downward in the holes 32 to a next level, for example 3 feet below the upper fracture zones 42. A starter niche using the jet spray is placed in the side of the hole and system of pumping the mud mixture is repeated forming second fracture zones 44. In FIG. 3, third fracture zones 46 are shown with fourth fracture zones 48 placed below the contamination site 34.

In FIG. 3, a single drill hole 32 is used for treating the fracture zones 42, 44, 46 and 48. While not shown in the drawings and for increased control, individual injection drill holes can be drilled for each fracture zone depending on soil and contamination conditions.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A method for in-situ bioremediation of contaminated ground water wherein porous inorganic support spheres such as diatomaceous earth pellets are treated by inoculation with selected non-pathogenic microbes for destroying or converting the contaminant, the steps comprising:

digging of a trench perpendicular to the movement of the ground water and downstream from the contaminated ground water, the trench dug below the level of the contaminated ground water;

filling the trench with porous inorganic support spheres inoculated with selected microbes thereby creating a porous wall; and directing a flow of the contaminated ground water through the trench filled with the inoculated support spheres and destroying and converting the contaminants in the ground water.

2. The method as described in claim 1 further including the step of installing aeration pipes at a bottom of the trench prior to filling the trench with the porous inorganic support spheres.

3. The method as described in claim 1 further including the step of filling the top of the trench with gravel after filling the trench with the porous inorganic support spheres.

4. The method as described in claim 1 further including the step of installing vent pipes in the trench after filling the trench with the porous inorganic support spheres, the vent pipes used for monitoring volatile contaminants emanating from the porous wall to monitor the progress of the bioremediation.

5. The method as described in claim 1 further including the step of adding nutrients in the form of an aqueous solutions by pouring the nutrients into the trench which move downwardly by gravity for feeding the inorganic support spheres.

6. The method as described in claim 2 further including the step of adding nutrients in the form of an aqueous solution by pouring the nutrients into the trench using the aeration pipes.

7. The method as described in claim 1 further including the step of drilling monitoring wells located upstream and downstream from the contaminated ground water for monitoring the effectiveness of the porous wall and recycling the water until acceptable contaminant levels are achieved.

8. A method for in-situ bioremediation of contaminated ground water wherein porous inorganic support spheres such as diatomaceous earth pellets are treated by inoculation with selected non-pathogenic microbes for destroying or converting the contaminant, the steps comprising:

digging of a trench perpendicular to the movement of the ground water and downstream from the contaminated ground water, the trench dug below the level of the contaminated ground water;

installing aeration pipes at a bottom of the trench;

filling the trench with porous inorganic support spheres inoculated with selected microbes thereby creating a porous wall; and directing a flow of the contaminated ground water through the trench filled with the inoculated support spheres and destroying and converting the contaminants in the ground water.

9. The method as described in claim 8 further including the step of filling the top of the trench with gravel after filling the trench with the porous inorganic support spheres.

10. The method as described in claim 8 further including the step of installing vent pipes in the trench after filling the trench with the porous inorganic support spheres, the vent pipes used for monitoring volatile contaminants emanating from the porous wall to monitor the progress of the bioremediation.

11. The method as described in claim 8 further including the step of adding nutrients in the form of an aqueous solutions by pouring the nutrients into the trench which move downwardly by gravity for feeding the inorganic support spheres.

12. The method as described in claim 8 further including the step of adding nutrients in the form of an aqueous solution by pouring the nutrients into the trench using the aeration pipes.

13. The method as described in claim 8 further including the step of drilling monitoring wells located upstream and downstream from the contaminated ground water for monitoring the effectiveness of the porous wall and recycling the water until acceptable contaminant levels are achieved.

14. A method for in-situ bioremediation of contaminated ground water wherein porous inorganic support spheres such as diatomaceous earth pellets are treated by inoculation with selected non-pathogenic microbes for destroying or converting the contaminant, the steps comprising:

digging of a trench perpendicular to the movement of the ground water and downstream from the contaminated ground water, the trench dug below the level of the contaminated ground water;

filling the trench with porous inorganic support spheres inoculated with selected microbes thereby creating a porous wall;

installing vent pipes in the trench, the vent pipes used for monitoring volatile contaminants emanating from the porous wall to monitor the progress of the bioremediation; and directing a flow of the contaminated ground water through the trench filled with the inoculated support spheres and destroying and converting the contaminants in the ground water.

15. The method as described in claim 14 further including the step of installing aeration pipes at a bottom of the trench prior to filling the trench with the porous inorganic support spheres.

16. The method as described in claim 14 further including the step of filling the top of the trench with gravel after filling the trench with the porous inorganic support spheres.

17. The method as described in claim 14 further including the step of adding nutrients in the form of an aqueous solutions by pouring the nutrients into the trench which move downwardly by gravity for feeding the inorganic support spheres.

18. The method as described in claim 15 further including the step of adding nutrients in the form of an aqueous solution by pouring the nutrients into the trench using the aeration pipes.

19. The method as described in claim 14 further including the step of drilling monitoring wells located upstream and downstream from the contaminated ground water for monitoring the effectiveness of the porous wall and recycling the water until acceptable contaminant levels are achieved.

* * * * *